United States Patent
Sawada (10) Patent No.: US 12,001,742 B2
(45) Date of Patent: Jun. 4, 2024

(54) PERFORMING INDEX PRINTING TO PRINT A PLURALITY OF IMAGES ON A SHEET

(71) Applicant: BROTHER KOGYO KABUSHIKI KAISHA, Nagoya (JP)

(72) Inventor: Kazuhide Sawada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/536,179

(22) Filed: Nov. 29, 2021

(65) Prior Publication Data
US 2022/0171587 A1      Jun. 2, 2022

(30) Foreign Application Priority Data
Nov. 30, 2020    (JP) ................. 2020-199005

(51) Int. Cl.
*G06F 3/12*         (2006.01)

(52) U.S. Cl.
CPC .......... *G06F 3/1247* (2013.01); *G06F 3/1203* (2013.01); *G06F 3/1248* (2013.01); *G06F 3/1297* (2013.01)

(58) Field of Classification Search
None
See application file for complete search history.

(56) References Cited

U.S. PATENT DOCUMENTS

| | | | |
|---|---|---|---|
| 2007/0203948 A1* | 8/2007 | Yoshida | ................. G06F 16/904 |
| 2007/0299750 A1 | 12/2007 | Aoki et al. | |
| 2008/0049273 A1 | 2/2008 | Fukaya | |
| 2009/0244610 A1 | 10/2009 | Mizutani et al. | |
| 2010/0060916 A1* | 3/2010 | Hattori | ............... H04N 1/00954 |
| | | | 358/1.9 |
| 2011/0205374 A1* | 8/2011 | Shinagawa | ........ H04N 1/32128 |
| | | | 348/207.2 |
| 2015/0227333 A1* | 8/2015 | Tanaka | .................. G06F 3/1267 |
| | | | 358/1.15 |

FOREIGN PATENT DOCUMENTS

| | | |
|---|---|---|
| JP | 2008-006618 A | 1/2008 |
| JP | 2008-054232 A | 3/2008 |
| JP | 2009-241524 A | 10/2009 |

* cited by examiner

*Primary Examiner* — Eric A. Rust
(74) *Attorney, Agent, or Firm* — Scully, Scott, Murphy & Presser, PC (57) ABSTRACT

A printing device includes a print engine, and a controller. The print engine performs an index print to print a plurality of images on one or more sheets, the plurality of images corresponding to respective ones of a plurality of files stored in an external memory. The controller controls the print engine. The controller performs determining a type of each of the plurality of files stored in the external device. The controller converts each file, which is determined as a non-image file and includes a page description language, to an image file representing contents of the each file by interpreting the page description language included in the each file. The controller generates a print command for the index print by referring to each image file which is stored in the external memory and each image file generated in the converting.

6 Claims, 8 Drawing Sheets

| FILE NAME | FORMAT | STATUS | THUMBNAIL IMAGE |
|---|---|---|---|
| $F_1$ Filename1.jpg | JPEG | NORMAL FILE | RESIZED IMAGE $G_1$ HAVING THUMBNAIL SIZE |
| $F_2$ Filename2.jpg | JPEG | INVALID FILE | JPEG ICON IMAGE $G_2$ |
| $F_3$ Filename3.pdf | PDF | NORMAL FILE | RASTERIZED IMAGE $G_3$ HAVING THUMBNAIL SIZE |
| $F_4$ Filename4.tif | TIFF | NORMAL FILE | RESIZED IMAGE $G_4$ HAVING THUMBNAIL SIZE |
| $F_5$ Filename5.bin | Binary | FILE FORMAT INCOMPATIBLE FOR PRINTING | ICON IMAGE $G_5$ REPRESENTING UNKNOWN FILE |
| $F_6$ Filename6.pdf | PDF | FILE INCOMPATIBLE FOR PRINTING | PDF ICON IMAGE $G_6$ |
| $F_7$ Filename7.pdf | PDF | NORMAL FILE | RASTERIZED IMAGE $G_7$ HAVING THUMBNAIL SIZE |
| $F_8$ Filename8.jpg | JPEG | NORMAL FILE | RESIZED IMAGE $G_8$ HAVING THUMBNAIL SIZE |
| $F_9$ Filename9.pdf | PDF | NORMAL FILE | RASTERIZED IMAGE $G_9$ HAVING THUMBNAIL SIZE |

PERFORMING INDEX PRINTING TO PRINT A PLURALITY OF IMAGES ON A SHEET

CROSS REFERENCE TO RELATED APPLICATION

This application claims priority from Japanese Patent Application No. 2020-199005 filed Nov. 30, 2020. The entire content of the priority application is incorporated herein by reference.

TECHNICAL FIELD

The present disclosure relates to a printing device performing an index print on a recording medium and a printing method.

BACKGROUND

Some conventional printing devices are provided with a USB direct print function for directly printing images in files stored in a USB memory device without requiring a printer driver. Such conventional printing devices have also been provided with an index print function for listing and printing images associated with a plurality of files stores on a USB memory device.

One conventional image output apparatus performs the following processes on each of a plurality of data files: (1) a process for determining the position on a printing medium of image data corresponding to the page description language (PDL) data for the first page in the data file; (2) a process for creating intermediate language data described in an intermediate language based on the PDL data for the first page in the data file; and (3) a process for generating image data from the intermediate language data and for writing the generated image data to band memory. These processes are followed by a process to print the image data for the plurality of images on a single page of the recording medium based on the content stored in the band memory.

SUMMARY

However, the conventional image output apparatus only considers PDL data as the subject of an index print and is not capable of performing an index print for content of a USB memory device that includes a mixture of PDL data and image data.

In view of the foregoing, it is an object of the present disclosure to provide a printing device and a printing method capable of performing an efficient index print for content in an external device that stores image files and files other than image files.

In order to attain the above and other objects, the disclosure provides a printing device. The printing device includes a print engine, and a controller. The print engine is configured to perform an index print to print a plurality of images on one or more sheets, the plurality of images corresponding to respective ones of a plurality of files stored in an external memory. The controller is configured to control the print engine, the controller being configured to perform: determining a type of each of the plurality of files stored in the external device; converting each file, which is determined as a non-image file and includes a page description language, to an image file representing contents of the each file by interpreting the page description language included in the each file; and generating a print command for the index print by referring to each image file which is stored in the external memory and each image file generated in the converting. According to the configuration, since the non-image file is converted to the image file, the print command can be interpreted in a short time period, and thus the index print can be performed quickly. When the external memory stores both the image file and the non-image file, the index print for the contents of these files can be efficiently performed.

According to another aspect, the disclosure provides a method for printing an index print to print a plurality of images on one or more sheets. The plurality of images corresponds to respective ones of a plurality of files stored in an external memory. The method includes: determining a type of each of the plurality of files stored in the external device; converting each file, which is determined as a non-image file and includes a page description language, to an image file representing contents of the each file by interpreting the page description language included in the each file; and generating a print command for the index print by referring to each image file which is stored in the external memory and each image file generated in the converting. According to the configuration, since the non-image file is converted to the image file, the print command can be interpreted in a short time period, and thus the index print can be performed quickly. When the external memory stores both the image file and the non-image file, the index print for the contents of these files can be efficiently performed.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment of the present disclosure will be described while referring to accompanied drawings.

Overall Structure of the Printer 10

Figure 1:
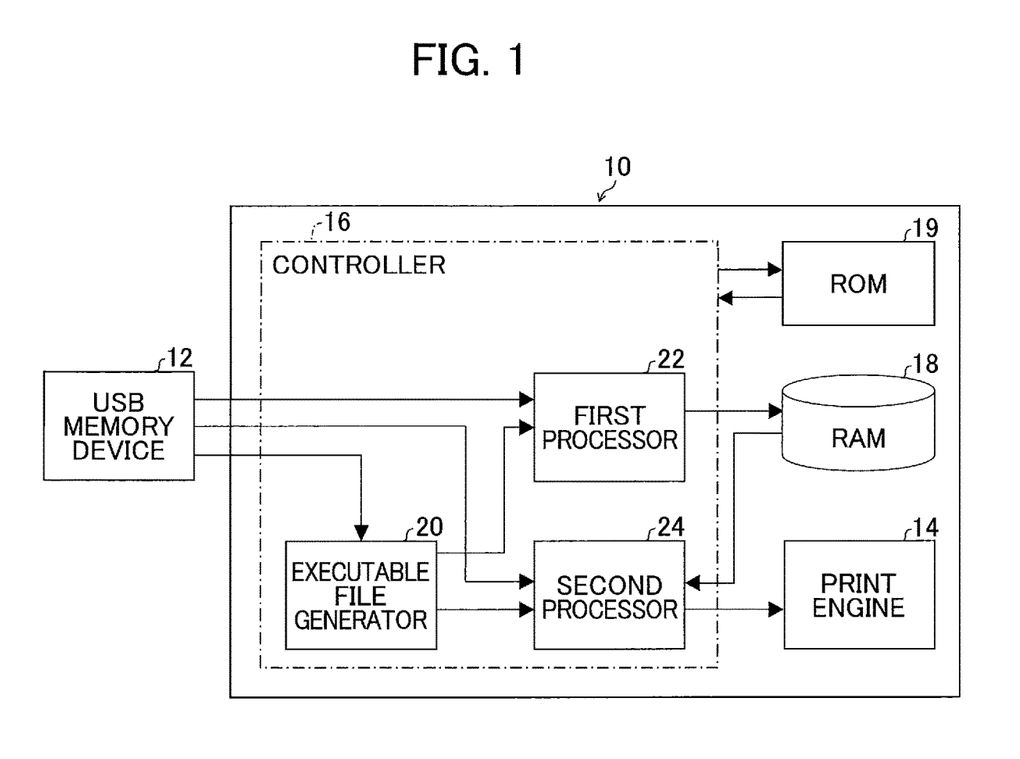
FIG. 1 is a block diagram illustrating an overall structure of a printer.

The overall structure of the printer 10 will be described while referring to FIG. 1. FIG. 1 is a block diagram illustrating the overall structure of the printer 10.

Figure 7:
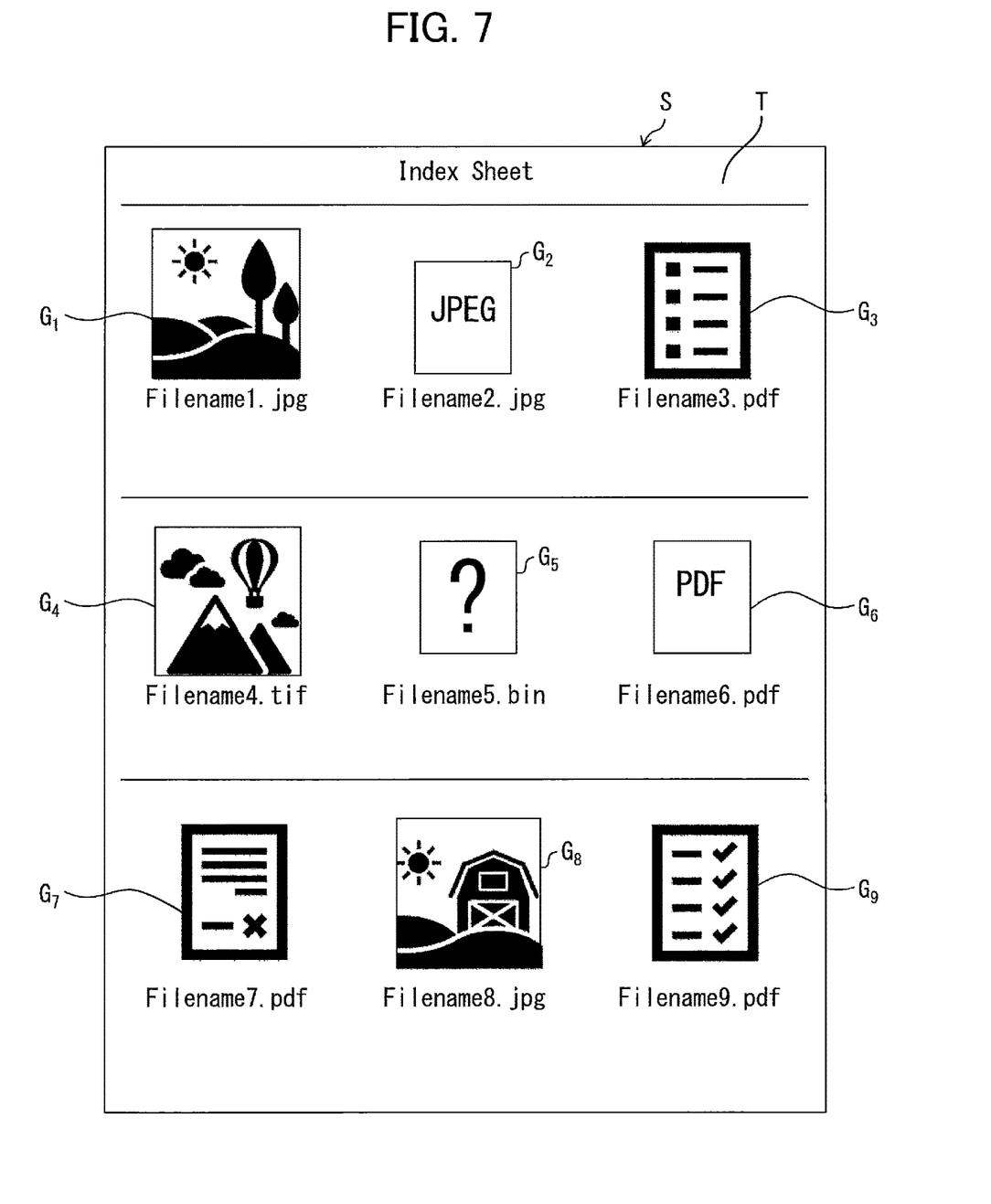
FIG. 7 is a schematic diagram showing contents of an index print.

The printer 10 is a printing device that prints an image on a sheet S, such as that shown in FIG. 7. The sheet S serves as the printing medium. The printer 10 has a PC print function for printing image data received from a personal computer (not shown). The printer 10 also has a direct print function for directly reading and printing image data stored in a USB memory device 12 constituting the external memory device. The USB memory device 12 is detachably mounted in the device body of the printer 10. The following description will focus primarily on structures of the printer 10 related to the direct print function.

The printer 10 is provided with a print engine 14 for printing images on sheets S, and an operation interface (not shown) for performing various settings and commands. The print engine 14 has a conveying mechanism for conveying the sheets S, and an inkjet-type or laser-type image-forming mechanism for executing printing operations on the sheets S, for example. The print engine 14 also performs an index print on sheets S. In the index print, the print engine 14 arranges and prints images for each of a plurality of files on a sheet S. Here, the plurality of files is stored in the USB memory device 12.

Although not shown in the drawings, the printer 10 is also provided with a host interface and a USB host interface. The printer 10 conducts data communications with a personal computer via the host interface. When the USB memory device 12 is mounted on the device body, the printer 10 reads print data from the USB memory device 12 via the USB host interface.

The printer 10 is also provided with a ROM 19 for storing various control programs and the like; a controller 16 for controlling the print engine 14, display (not shown), and the like while referencing the various control programs read from ROM 19; and a RAM 18. The RAM 18 is used as a work area into which various control programs are read, and a storage area for temporarily storing print data. The RAM 18 also temporarily stores icon images for JPEG files, TIFF files, and PDF files; and a generic icon image for files of unknown types. The icon images for JPEG files, TIFF files, and PDF files are icons showing file types of JPEG, TIFF, and PDF respectively. The generic icon image for files of unknown types is an icon showing that the file type is unknown or the file has a format incompatible for printing.

Detailed Structure of the Controller 16

The controller 16 is provided with an executable file generator 20, a first processor 22, and a second processor 24. The executable file generator 20 executes a determination process for determining the type of each file written in the RAM 18 or the USB memory, for example. Specifically, the executable file generator 20 references the extension included in the filename for each file written in the RAM 18 or the USB memory to determine whether the file is a PDF file. A PDF file is not an image file and is an example of a file conforming to a specific format. An image file is a file storing an image, such as a JPEG file and a TIFF file. In other words, the image file is a file of a format storing only an image as a target object of printing. Further, a non-image file may include a file of a specific format, such as a PDF, capable of storing an object other than an image object as a target object of printing in the present embodiment.

The first processor 22 executes a conversion process for converting a file determined to be a PDF file in the determination process into a JPEG file storing an image that corresponds to this PDF file by interpreting the page description language (PDL) stored in the PDF file. Specifically, the first processor 22 uses a special-purpose program module supporting the PDF file format (the specific format) to perform a raster image processor (RIP) process on the first page in the file. Through this process, the first processor 22 converts the first page of the PDF file to a JPEG file storing a thumbnail image corresponding to the first page. The generated JPEG file is stored in the RAM 18, for example. The JPEG file is one type of image file in a compressed format.

The executable file generator 20 also references the one or more image files stored in the USB memory device 12 and the one or more JPEG files obtained in the conversion process for executing a print command generation process to generate a print command IC for an index print (hereinafter called an "index print command IC"). Specifically, the executable file generator 20 generates the index print command IC by referencing images in the one or more image files stored in the USB memory device 12 and their file paths in the USB memory device 12, and the images in the one or more JPEG files obtained in the conversion process and their file paths in the RAM 18. The content of the index print command IC will be described later with reference to FIG. 2.

The second processor 24 executes an index print while interpreting the index print command IC. Specifically, the second processor 24 interprets the index print command IC to perform a RIP process on each of the plurality of files using a general-purpose program module that supports a plurality of formats. The second processor 24 interprets the index print command IC in order to control the print engine 14 to perform the index print on one or more sheets S so that thumbnail images corresponding to the plurality of files are arranged on one or more sheets S.

Print Commands for Index Printing

Figure 2:
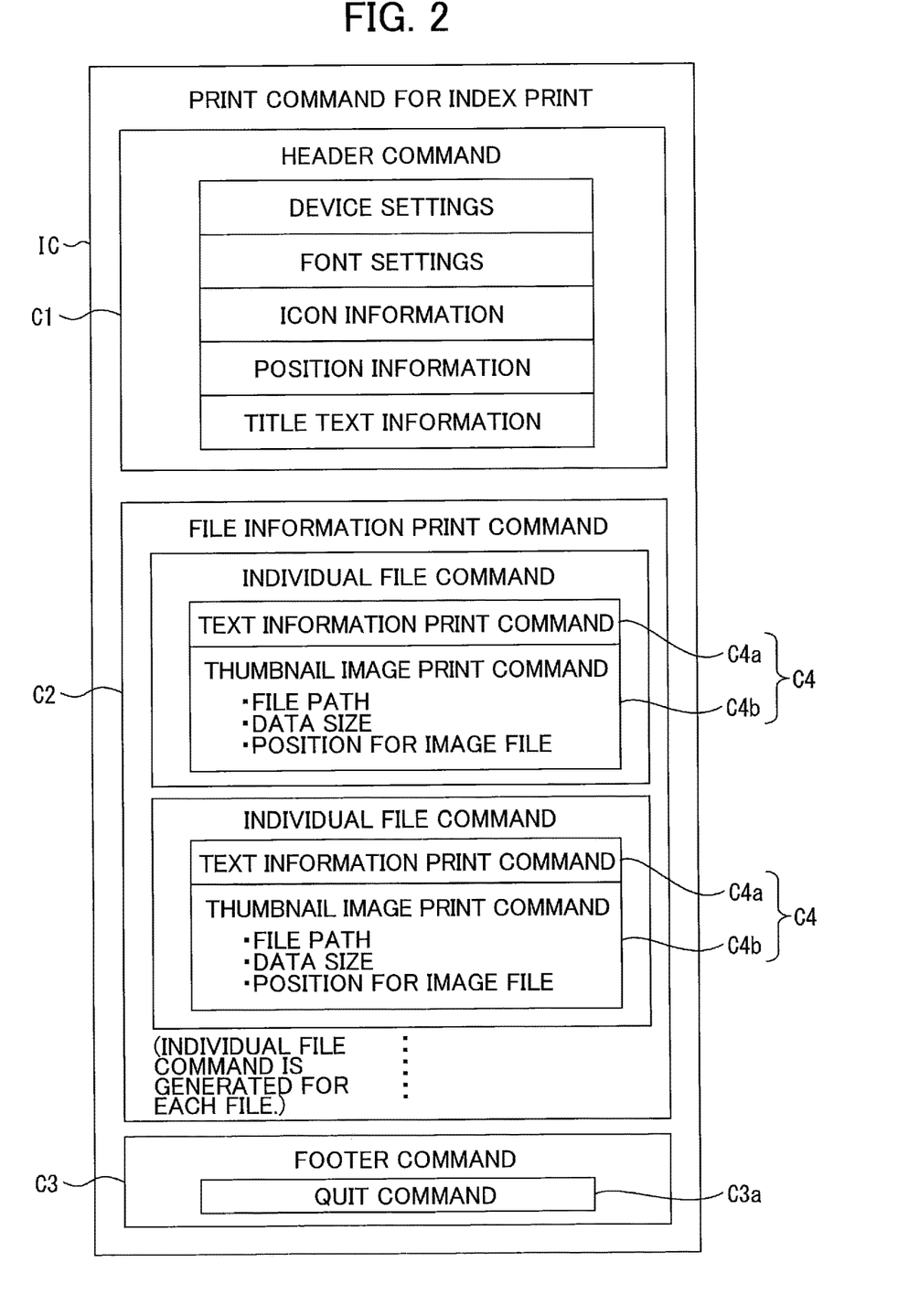
FIG. 2 is an explanatory diagram showing a print command for an index print.

Next, the content of an index print command IC will be described in detail with reference to FIG. 2. FIG. 2 is an explanatory diagram showing a print command for an index print.

As shown in FIG. 2, the index print command IC is configured of a header command C1, a file information print command C2, and a footer command C3. The header command C1 includes device settings for setting the size of the sheet S shown in FIG. 7 and the like; font settings for setting the font for the print text; icon information representing the JPEG icon image and other icon images; position information specifying the layout for the plurality of files (thumbnails); and title text information representing title text T to be printed, such as the text "Index Sheet" in FIG. 7.

The file information print command C2 includes a plurality of file commands C4. The file commands C4 are provided for printing thumbnail images of images files stored in the USB memory device 12 and thumbnail images of JPEG files obtained in the conversion process. Each file command C4 includes a text information print command C4a for printing the filename of an image file such as a JPEG file or other file such as a PDF file, and a thumbnail image print command C4b for printing a thumbnail image. The file name to be printed by the text information print command C4a is a file name of a file from which a thumbnail image is generated. The thumbnail image print command C4b includes the file path for the image file, the data size of the file, and the position for the image file on the sheet S.

The footer command C3 includes a quit command C3a for quitting the index print, and a delete command (not shown) for deleting the JPEG files saved in the RAM 18.

Printing Method

Figure 3:
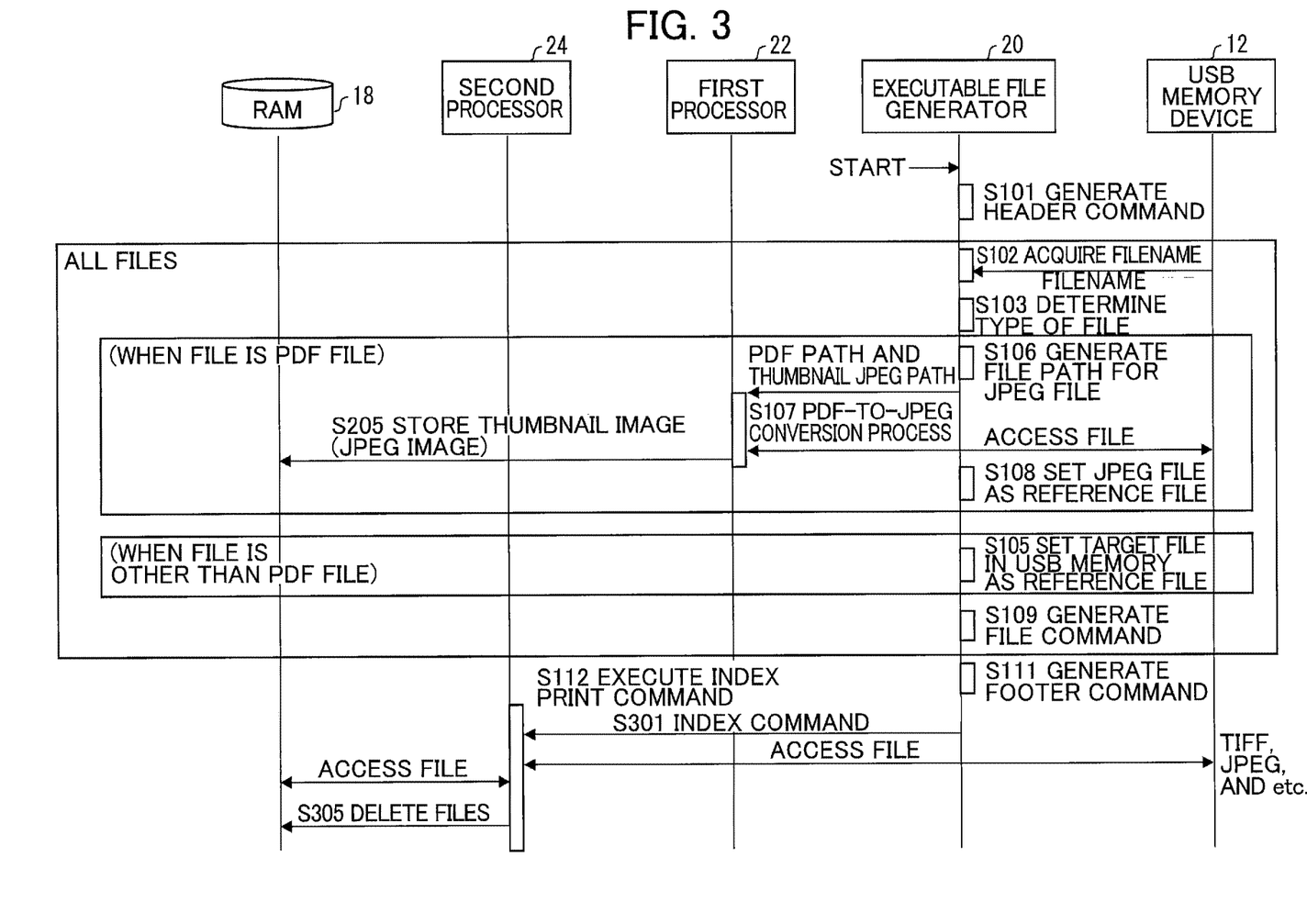
FIG. 3 is a sequence diagram illustrating a printing method according to the embodiment.
Figure 4:
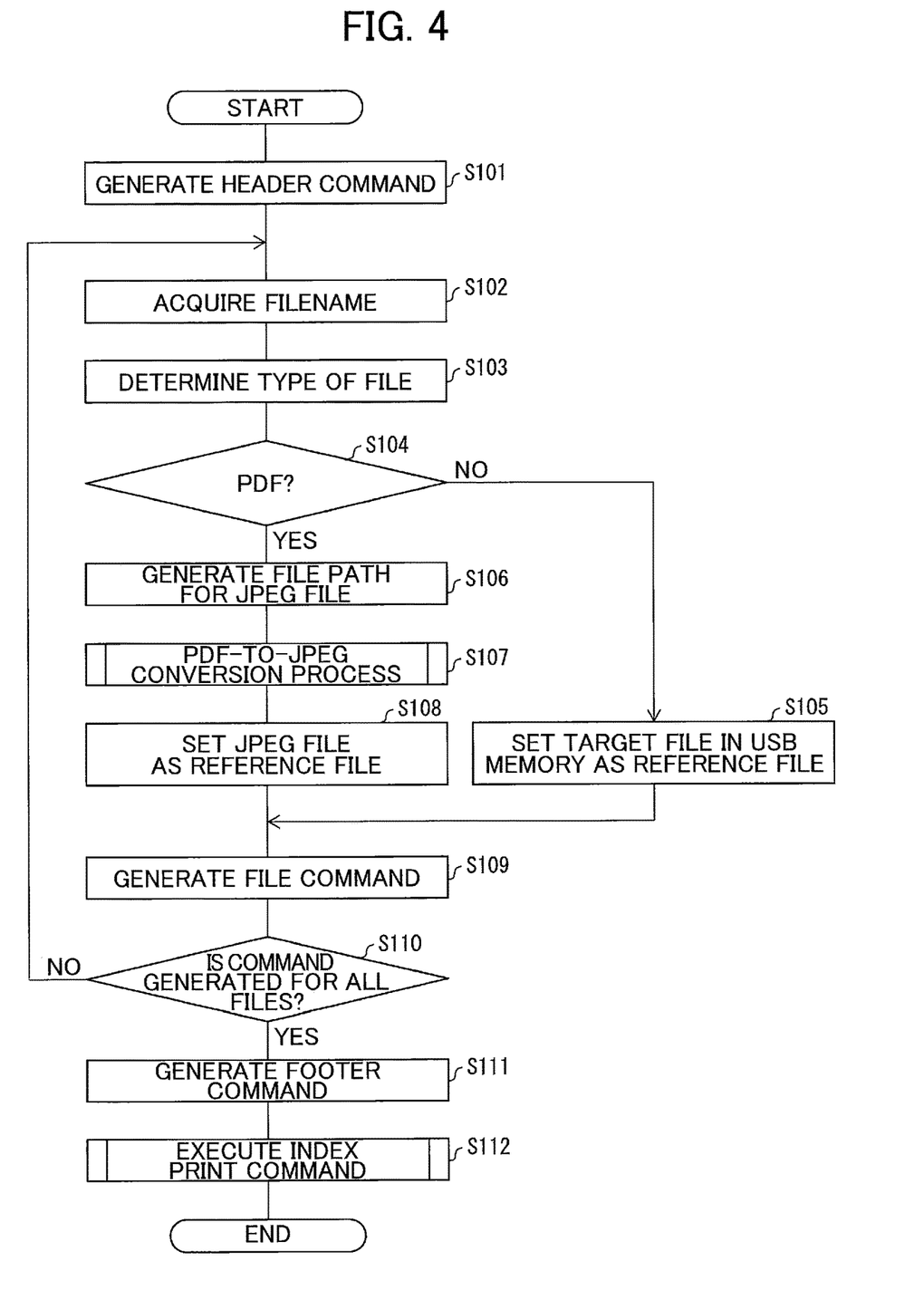
FIG. 4 is a flowchart illustrating the printing method of FIG. 3.

Next, the printing method according to the embodiment will be described with reference to FIGS. 1 through 4, and FIGS. 3 and 4 in particular. FIG. 3 is a sequence diagram showing steps in the printing method according to the embodiment. The step numbers indicated in FIG. 3 correspond to steps in FIGS. 4 through 6. FIG. 4 is a flowchart illustrating steps in the printing method of FIG. 3. Note that the sequence diagram in FIG. 3 and the flowchart in FIG. 4 are merely an example, and the present disclosure is not limited to this example.

As shown in FIGS. 3 and 4, when a command to perform an index print is inputted while the USB memory device 12 is mounted in the device body of the printer 10, in S101 the executable file generator 20 generates the header command C1 by referencing related instructions and the like.

In S102 the executable file generator 20 acquires the filename for a file in the USB memory device 12 and stores these file names in the RAM 18 and in S103 determines the type of that file. The executable file generator 20 may store all the files stored in the USB memory device 12 to in the RAM 18. In S104 the executable file generator 20 determines whether the file under consideration (hereinafter called the "target file") is a PDF file. In a case that the target file is not a PDF file (S104: NO), i.e., a case that the target file is an image file, in S105 the executable file generator 20 sets the target file in the USB memory device 12 as a reference file. The reference file is a file whose image is to be printed as a thumbnail in the index print.

At this time, the executable file generator 20 sets the JPEG icon image or TIFF icon image stored in the RAM 18 as a reference file in a case that the target file is invalid, corrupt or incompatible for printing. The executable file generator 20 sets an unknown file icon image (generic icon image for files of unknown types) stored in the RAM 18 as a reference file in a case that the target file has a format incompatible for printing.

In a case that the target file is a PDF file (S104: YES), in S106 the executable file generator 20 generates a file path for a JPEG file storing a thumbnail image corresponding to the target file. Here, the file path for the JPEG file designates a location in the RAM 18. In S106, the executable file generator 20 transmits to the first processor 22 the generated file path for the JPEG file and a file path of the target file (the PDF file). In S107 the first processor 22 executes a PDF-to-JPEG conversion process to convert the target file to a JPEG file using the special-purpose program module supporting the PDF file format. Here, the PDF-to-JPEG conversion process generates the JPEG file based on the target file which is designated by the file path received from the executable file generator 20, and stores the JPEG file in a location in the path designated by the received file path for the JPEG file. In S108 the executable file generator 20 sets the file converted to the JPEG file as a reference file. The PDF-to-JPEG conversion process of S107 will be described later in detail.

Here, the executable file generator 20 sets the PDF icon image stored in the RAM 18 as a reference file when the target file is invalid or incompatible for printing.

In S109 the executable file generator 20 generates a file command C4 for the target file by referencing related instructions and the like. In S110 the controller 16 determines whether a file command C4 has been generated for all files stored in the USB memory device 12.

In a case that file commands C4 have not been generated for all files stored in the USB memory device 12 (S110: NO), the controller 16 returns to S102. In other words, the controller 16 repeats the process from S102 to S109 until a file command C4 has been generated for each file stored in the USB memory device 12.

In a case that file commands C4 have been generated for all files stored in the USB memory device 12 (S110: YES), in S111 the executable file generator 20 generates a footer command C3 by referencing related instructions and the like. Through this process, the executable file generator 20 can generate an index print command IC having a header command C1, a file information print command C2, and a footer command C3.

In a case that file commands C4 have been generated for all files stored in the USB memory device 12 (S110: YES) and thereafter S111 is executed, in S112 the second processor 24 interprets the index print command IC by using the general-purpose program module that supports a plurality of formats to execute an index print. The process for executing a print command in S112 will be described later in greater detail.

PDF-to-JPEG Conversion Process

Figure 5:
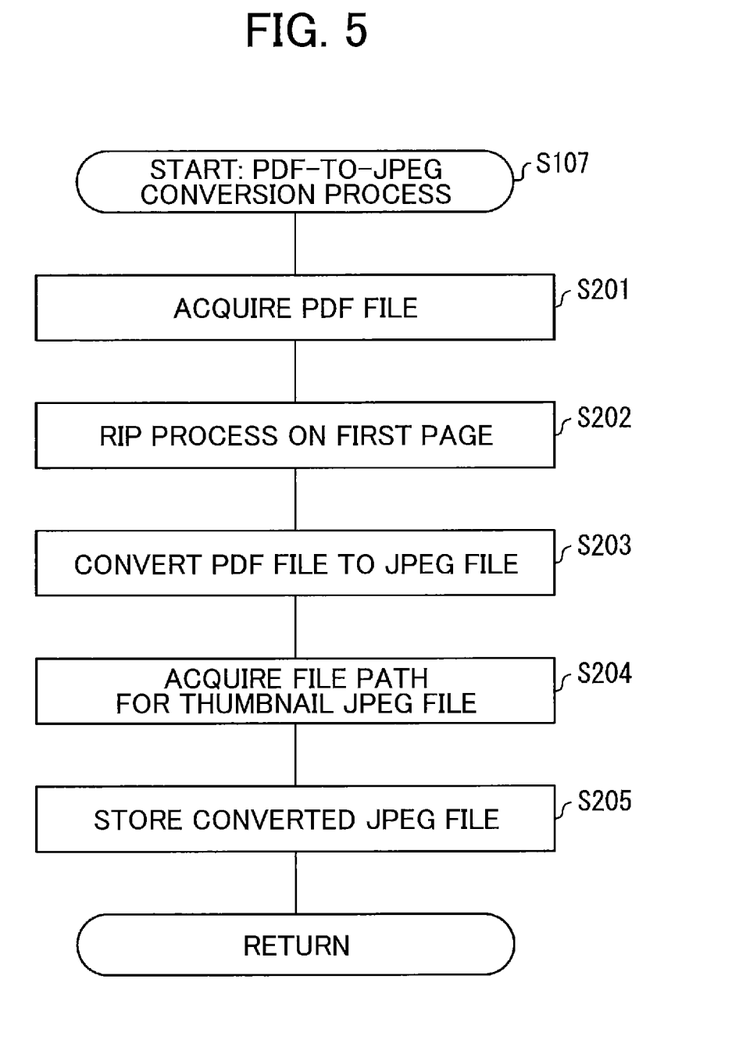
FIG. 5 is a flowchart illustrating a PDF-to-JPEG conversion process as part of the printing method shown in FIG. 3.

Steps in the PDF-to-JPEG conversion process constituting part of the printing method according to the embodiment will be described with reference to FIGS. 1 through 3 and 5, and FIGS. 3 and 5 in particular. FIG. 5 is a flowchart illustrating steps in the PDF-to-JPEG conversion process as part of the printing method in FIG. 3. Note that the flowchart shown in FIG. 5 is merely one example, and the present disclosure is not limited to this example.

As shown in FIGS. 1 through 3 and 5, in S201 the first processor 22 acquires print data for the target file (PDF file) from the USB memory device 12 by referring to the file path received from the executable file generator 20. In this case, the target file is a PDF file. In S202 the first processor 22 performs a RIP process on the first page in the PDF file, and in S203 converts the PDF file to a JPEG file storing a thumbnail image for the first page based on the result of the RIP process. In the rip process of S202, the first processor 22 uses the special-purpose program module supporting the PDF file format to interpret the PDL of the first page stored in the PDF file, and generates an image file representing the first image of the PDF file. In S203 the first processor 22 converts the generated image into the JPEG file. In S204 the first processor 22 further acquires the file path designating the location in the RAM 18 for the thumbnail image, which is received from the executable file generator 20, and in S205 saves the converted JPEG file at the acquired file path in the RAM 18.

Print Command Execution Process

Figure 6:
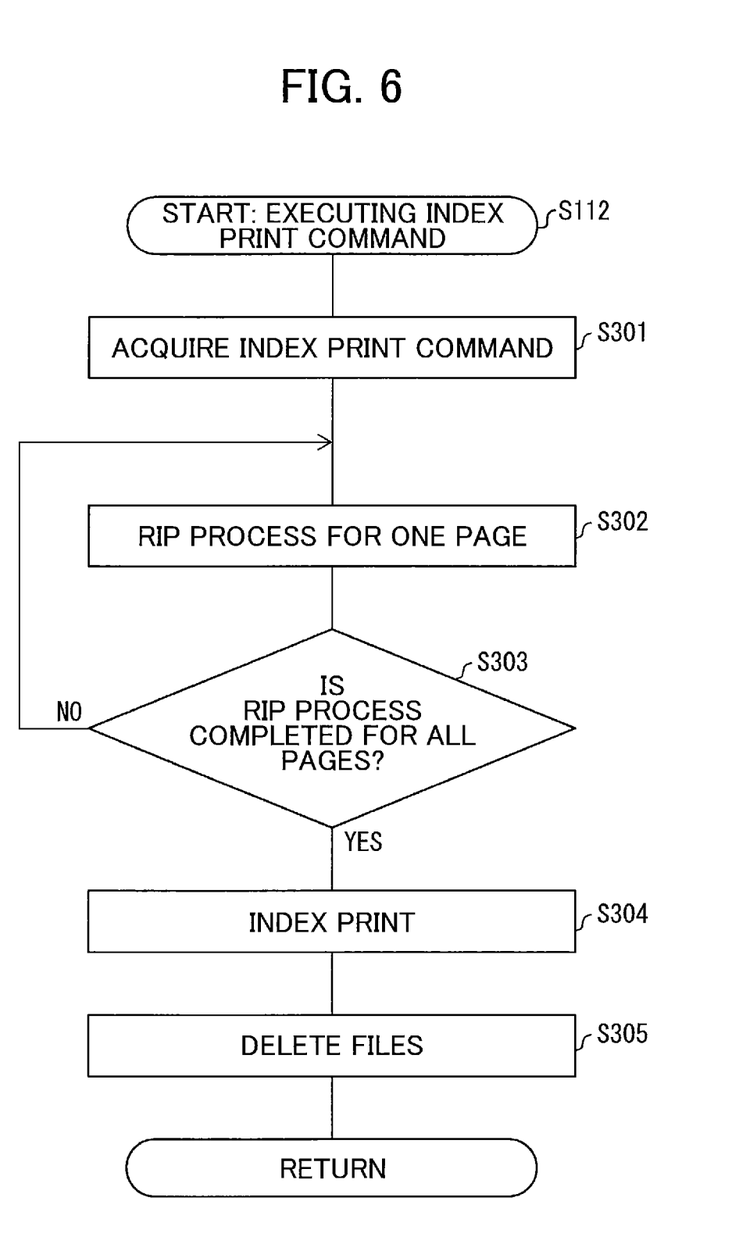
FIG. 6 is a flowchart illustrating steps in a print command execution process executed in the printing method of FIG. 3.

Next, steps in the process for executing a print command within the index printing process constituting part of the printing method according to the embodiment will be described with reference to FIGS. 1 through 3 and 6, and FIGS. 3 and 6 in particular. FIG. 6 is a flowchart illustrating steps in the print command execution process as part of the printing method of FIG. 3. The flowchart shown in FIG. 6 is merely one example, and the present disclosure is not limited to this example.

In S301 the second processor 24 acquires an index print command IC which is transmitted from the executable file generator 20. In S302 the second processor 24 performs a RIP process on each of the plurality of image files to be included on the sheet for one page in the index print by using the general-purpose program module that supports a plurality of formats. In S303 the second processor 24 determines whether the RIP process has been completed for the image files to be included in all pages.

In a case that the RIP process has not been completed for the pluralities of images included in all pages (S303: NO), the second processor 24 returns to S302.

Once the RIP process has been completed for the image files included in all pages (S303: YES), in S304 the second processor 24 controls the print engine 14 while interpreting the index print command IC in order to perform an index print on one or more sheets S. In the index print, images represented by the reference files are printed as thumbnail images in one page. In S305 the second processor 24 deletes the JPEG files saved in the RAM 18 as reference files.

Content of an Index Print

Figure 8:
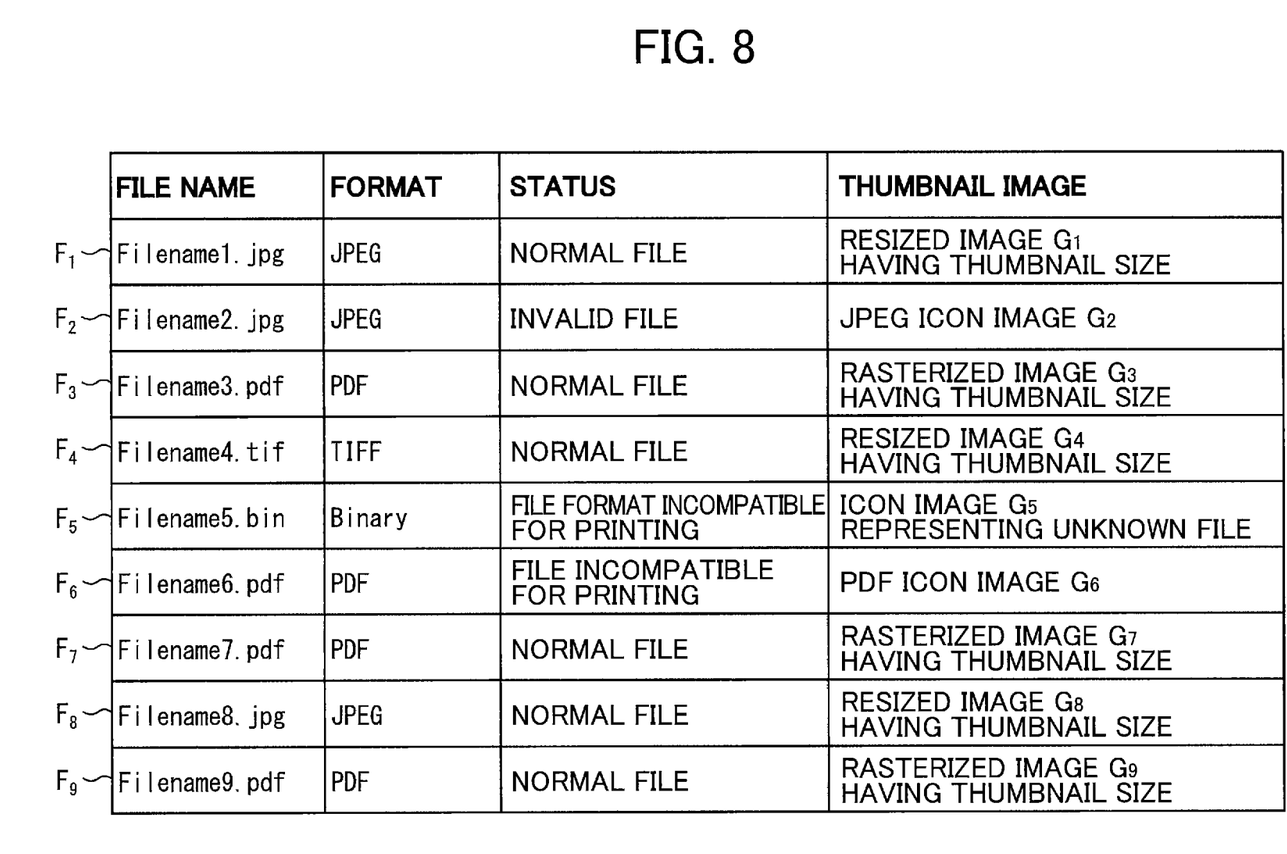
FIG. 8 is a table explaining a plurality of files constituting the contents of the index print.

Next, the content of an index print will be described with reference to FIGS. 7 and 8. FIG. 7 is a schematic diagram showing content of an index print performed on the printer 10. FIG. 8 is a table explaining the plurality of files $F_1$-$F_9$ constituting the content of an index print performed on the printer 10.

In the example shown in FIGS. 7 and 8, nine images $G_1$-$G_9$ correspond to the nine files $F_1$-$F_9$ stored in the USB memory device 12 in FIG. 1. These nine images $G_1$-$G_9$ are printed through an index print performed on the printer 10. The images $G_1$-$G_9$ are arranged in three rows and three columns within an area on a sheet S excluding the uppermost part. The title text T is printed in the uppermost part of the sheet S. In this example, the title text T is "Index Sheet."

Of the nine files $F_1$-$F_9$ in this example, files $F_3$, $F_6$, $F_7$, and $F_9$ are PDF files. Files $F_3$, $F_7$, and $F_9$ are normal files, and thumbnail images corresponding to the files $F_3$, $F_7$, and $F_9$ are displayed as the images $G_3$, $G_7$, and $G_9$. The file $F_6$ is an invalid file or a file that is incompatible for printing. Therefore, a PDF icon image is displayed as the image $G_6$ corresponding to file $F_6$.

Of the nine files $F_1$-$F_9$ in this example, files $F_1$, $F_2$, and $F_8$ are JPEG files. Files $F_1$ and $F_8$ are normal files and, hence, thumbnail images are displayed as the images $G_1$ and $G_8$ corresponding to the files $F_1$ and $F_8$. The file $F_2$ is an invalid file or a file incompatible for printing and, hence, a JPEG icon image is displayed as the image $G_2$ corresponding to the file $F_2$.

Of the nine files $F_1$-$F_9$ in this example, the file $F_4$ is a TIFF file and a normal file. Hence, a thumbnail image is displayed as the image $G_4$ corresponding to the file $F_4$.

Of the nine files $F_1$-$F_9$ in this example, the file $F_5$ is a binary file and has a format incompatible for printing. Therefore, an icon image representing an unknown file (the generic icon image for files of unknown types) is displayed as the image $G_5$ corresponding to the file $F_5$.

Operations and Effects

Next, the operations and effects of the printer 10 according to the embodiment will be described.

Before generating the index print command IC in the embodiment, the controller 16 converts files determined to be PDF files, which are not image files, to JPEG files, which are image files. Therefore, the controller 16 can interpret the index print command IC in a short amount of time, and the print engine 14 can perform an index print on sheets S quickly.

A specific feature of the embodiment is that the controller 16 converts files conforming to a specific format, which is not an image file format (files that the controller 16 determines to be PDF files in this example) to image files (JPEG files in this example) using the special-purpose program module supporting the specific format. Accordingly, the controller 16 can interpret the index print command in a shorter period of time, and the print engine 14 can perform an index print on sheets S more quickly.

Therefore, the printer 10 according to the embodiment can perform an index print efficiently for content stored in the USB memory device 12, when the content includes both image files and files other than image files.

Since the image files obtained in the conversion process are JPEG files, which are files in a compressed format, the image files obtained in the conversion process have a smaller data size.

Variations of the Embodiment

In the embodiment, PDF files are the subject of the conversion process performed using the special-purpose program module, but the present disclosure is not limited to this file type. Files other than PDF files, such as PDL files, XML Paper Specification (XPS) files, or Printer Command Language (PCL) document files may be targeted for the conversion process with the special-purpose program module.

While the conversion process performed using the special-purpose program module is configured to generate a JPEG file in the embodiment, the present disclosure is not limited to this file type. The conversion process may be configured to obtain image files other than JPEG files, such as TIFF files, GIF files, or PNG files by using the special-purpose program module, for example. Further, although the conversion process performed using the special-purpose program module is configured to generate image files in a compressed format in the embodiment, the present disclosure is not limited to this file format. That is, the conversion process may be configured to obtain image files in a non-compressed format. While employing a conversion process configured to obtain image files in a compressed format has the effect of reducing the data size of the image files obtained in the conversion process, employing a conversion process configured to obtain image files in a non-compressed format has the effect of completing the conversion process faster.

While the USB memory serves as an example of the external memory in the embodiment, the present disclosure is not limited to this memory type. For example, a memory card may be used in place of the USB memory device. In this case, the printer 10 performs a direct print, whereby print data for files stored in the memory card is read and printed directly. Further, the image files obtained in the conversion process may be files in an uncompressed format rather than files in a compressed format.

The technical idea employed in the printer 10 as the printing device may be applied to other devices having a printing function, such as a multifunction peripheral, a facsimile device.

Examples Achieved by Software

The controlling block (the controller 16) in the printer 10 may be achieved by an integrated circuit (IC chip), or software.

In the latter case, the printer 10 includes a computer executing instructions of programs which are software achieving the functions described above. This computer includes one or more processors and a computer readable storage medium storing the program. In the computer, the processor reads the programs from the storage medium and executes these programs to achieve the object or purpose of the present disclosure. The processor may be a CPU. The storage medium is a non-transitory tangible medium, such as a ROM, a tape, a disk, a card, a semiconductor memory, and a programmable logical circuit. The storage medium may be provided with a RANI in which programs are expanded. The programs are provided to the computer via any transmission medium (communication network or broadcasting wave) that can transmit the programs. An aspect of the present disclosure may be implemented in a form of a data signal embedded in a carrier wave by which the program is embodied according to electrical transmission.

Supplementary Information

While the disclosure has been described in detail with reference to the specific embodiment thereof, it would be apparent to those skilled in the art that various changes and modifications may be made therein without departing from the scope of the invention.

What is claimed is:

1. A printing device comprising:
a print engine configured to perform an index print to print a plurality of thumbnail images on one sheet, the plurality of thumbnail images corresponding to respective ones of a plurality of files stored in an external memory; and
a controller configured to control the print engine, the controller being configured to perform:
   determining a type of each of the plurality of files stored in the external memory;
   setting each file determined to be an image file as a first reference file to be used to generate a thumbnail image for the index print;
   converting each file, which is determined as a non-image file and includes a page description language, to an image file representing contents of the each file by interpreting the page description language included in the each file;
   setting the image file converted from each file, which is determined as a non-image file and includes a page description language, as a second reference file to be used to generate a thumbnail image for the index print;
   generating a print command for the index print to print, on the one sheet, the plurality of thumbnail images including the thumbnail image based on each image file set as the first reference file and the thumbnail image based on each image file set as the second reference file; and
   controlling the print engine to print an index image according to the print command so that the plurality of thumbnail images including the thumbnail image based on each image file set as the first reference file and the thumbnail image based on each image file set as the second reference file is printed on the one sheet.

2. The printing device according to claim 1, wherein for each file of a specific file format different from an image file format, the converting converts the each file into an image file representing an image corresponding to the each file by interpreting the page description language included in the each file using a special-purpose program module supporting the specific file format, wherein the controlling controls the print engine to print the index image by interpreting the generated print command by using a general-purpose program module that supports a plurality of file formats.

3. The printing device according to claim 2, wherein the specific format is a Portable Document Format file.

4. The printing device according to claim 1, wherein the converting converts each file into an image file in a compressed format.

5. The printing device according to claim 1, wherein the image file is a file of a format storing only an image as a target object of printing, and the non-image file includes a file of a specific format capable of storing an object other than an image as a target object of printing.

6. A method for printing an index print to print a plurality of thumbnail images on one sheet, the plurality of thumbnail images corresponding to respective ones of a plurality of files stored in an external memory, the method comprising:
   determining a type of each of the plurality of files stored in the external memory;
   setting each file determined to be an image file as a first reference file to be used to generate a thumbnail image for the index print;
   converting each file, which is determined as a non-image file and includes a page description language, to an image file representing contents of the each file by interpreting the page description language included in the each file;
   setting the image file converted from each file, which is determined as a non-image file and includes a page description language, as a second reference file to be used to generate a thumbnail image for the index print;
   generating a print command for the index print to print, on the one sheet, the plurality of thumbnail images including the thumbnail image based on each image file set as the first reference file and the thumbnail image based on each image file set as the second reference file; and
   controlling a print engine to print an index image according to the print command so that the plurality of thumbnail images including the thumbnail image based on each image file set as the first reference file and the thumbnail image based on each image file set as the second reference file is printed on the one sheet.

* * * * *